United States Patent
Dehaene

(10) Patent No.: US 9,794,503 B2
(45) Date of Patent: Oct. 17, 2017

(54) TIME CODE IMAGE SENSOR

(71) Applicant: Commissariat à l'Énergie Atomique et aux Énergies Alternatives, Paris (FR)

(72) Inventor: David Dehaene, Palaiseau (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 72 days.

(21) Appl. No.: 15/134,173

(22) Filed: Apr. 20, 2016

(65) Prior Publication Data

US 2016/0323530 A1     Nov. 3, 2016

(30) Foreign Application Priority Data

Apr. 28, 2015   (FR) ...................................... 15 53799

(51) Int. Cl.
*H04N 5/376*     (2011.01)
*H04N 5/355*     (2011.01)
*H04N 5/3745*    (2011.01)
*H04N 5/369*     (2011.01)
*H04N 5/378*     (2011.01)

(52) U.S. Cl.
CPC ........... *H04N 5/3765* (2013.01); *H04N 5/355* (2013.01); *H04N 5/3698* (2013.01); *H04N 5/378* (2013.01); *H04N 5/37455* (2013.01)

(58) Field of Classification Search
CPC .. H04N 5/355; H04N 5/3698; H04N 5/37455; H04N 5/3765; H04N 5/378
See application file for complete search history.

(56) References Cited

U.S. PATENT DOCUMENTS

| | | | | |
|---|---|---|---|---|
| 8,854,532 B2* | 10/2014 | Iwasaki | .............. | H04N 5/23212 348/348 |
| 9,313,476 B2* | 4/2016 | Sun | ..................... | H04N 13/0271 |
| 2010/0182468 A1* | 7/2010 | Posch | .................... | H04N 3/155 348/294 |
| 2011/0102647 A1* | 5/2011 | Kim | ...................... | H04N 5/361 348/243 |

(Continued)

OTHER PUBLICATIONS

Search Report, dated Feb. 17, 2016, from corresponding French Application No. 15/53799.

(Continued)

*Primary Examiner* — Amy Hsu
(74) *Attorney, Agent, or Firm* — Wolf, Greenfield & Sacks, P.C.

(57) ABSTRACT

An image sensor including: a first control circuit; a plurality of pixels, each including a photodetector, a comparator of the level of an output signal of the photodetector with a reference value, and a second control circuit connected to the first control circuit, the second circuit being capable of sending a signal of address reading request to the first circuit when the pixel turns on, of receiving an address reading acknowledgement signal transmitted by the first circuit, and of deactivating the pixel on reception of the reading acknowledgement signal; and at least one third control circuit capable, when a pixel receives a reading acknowledgement signal, of blocking the transmission of address reading request signals in at least one adjacent pixel.

13 Claims, 3 Drawing Sheets

(56) References Cited

U.S. PATENT DOCUMENTS

2013/0248689 A1* 9/2013 Eldesouki ................. G01J 1/46
250/208.1
2015/0195469 A1* 7/2015 Kim ....................... H04N 5/374
348/308

OTHER PUBLICATIONS

Guo et al.: "A Time-to-First-Spike CMOS Image Sensor," (2007) IEEE Sensors Journal; pp. 1165-1175.
Luo et al.: "A Time-Based CMOS Image Senso," (2004) ISCAS; pp. 840-843.
Qi et al.: "A Time-To-First Spike CMOS Imager," (2004) ISCAS; pp. 824-827.
Posch et al.: "An Asynchronous Time-based Image Sesnor," (2008) IEEE; pp. 2130-2133.

* cited by examiner

TIME CODE IMAGE SENSOR

CROSS-REFERENCE TO RELATED APPLICATION

This application claims the priority benefit of French patent application number 15/53799, filed on Apr. 28, 2015, the content of which is hereby incorporated by reference in its entirety to the maximum extent allowable by law.

BACKGROUND

The present disclosure generally relates to image sensors, and more specifically aims at time code image sensors.

DISCUSSION OF THE RELATED ART

Conventionally, an image sensor comprises a plurality of identical or similar pixels (or elementary cells), for example arranged in an array of rows and columns. Each pixel comprises a photodiode having its capacitance discharged by a photocurrent according to a received light intensity. Conventionally, during an image acquisition phase, each pixel is first reset by recharging of its photodiode to a reset voltage. The photodiode is then isolated from the node of application of the reset voltage, and the voltage across the photodiode decreases according to the light intensity received by the pixel. After a predetermined integration period identical for all the sensor pixels, each pixel delivers an analog output signal representative of the voltage across its photodiode. This signal is digitized by an analog-to-digital conversion circuit, and forms the output value of the pixel.

To overcome certain disadvantages of conventional image sensors, especially in terms of dynamic range, of signal-to-noise ratio, and/or of power consumption, so-called time code image sensors having been provided, where each pixel comprises a comparator comparing the voltage across the photodiode with a reference voltage. During an image acquisition phase, each pixel is first reset by recharging of its photodiode to a reset voltage. The photodiode of each pixel is then isolated from the node of application of the reset voltage, and the voltage across the photodiode decreases according to the light intensity received by the pixel. When the voltage across the photodiode of a pixel reaches the reference voltage, the comparator output switches state. The pixel is said to turn on. The pixel then generates a pulse transmitted to a read circuit external to the pixel. The address of the pixel having emitted the pulse is then determined by the read circuit. The time of reading of the pixel address is stored and forms the pixel output value.

Sensors where each pixel can only turn on once during an image acquisition phase are here more specifically considered. An example of such a sensor is for example described in article "A time-to-first spike CMOS imager" of Xin Qi et al.

There is a need to at least partly improve certain aspects of known time code image sensors.

SUMMARY

To achieve this, an embodiment provides an image sensor comprising: a first control circuit; a plurality of pixels, each comprising a photodetector, a comparator of the level of an output signal of the photodetector with a reference value, and a second control circuit connected to the first control circuit, the second circuit being capable of sending a signal of address reading request to the first circuit when the pixel turns on, that is, when the level of the output signal of its photo-detector reaches the reference value, of receiving an address reading acknowledgement signal transmitted by the first circuit, and of deactivating the pixel on reception of the reading acknowledgement signal; and at least one third control circuit capable, when a pixel receives a reading acknowledgement signal, of blocking the transmission of signals of address reading request in at least one adjacent pixel.

According to an embodiment, the pixels are arranged in an array of rows and columns, the array being divided into a plurality of blocks of adjacent pixels, the sensor comprising a third circuit of control by pixel block, connected to the second circuits of the different pixels in the block.

According to an embodiment, in each block of adjacent pixels, the third control circuit is capable, during an image acquisition phase, when a first pixel in the block receives a reading acknowledgement signal, of blocking the transmission of signals of address reading request in all the pixels in the block for a predetermined inhibition period.

According to an embodiment, the pixels of the block which turn on during the inhibition period are deactivated without being read by the first control circuit.

According to an embodiment, the value of the first pixel in the block to have been acknowledged is assigned to the block pixels which have been deactivated during the inhibition period.

According to an embodiment, at the end of the inhibition period, for the block pixels which have not turned on yet, the transmission of address reading requests is unlocked.

According to an embodiment, at the end of a predetermined integration period of the sensor, the sensor pixels which have not turned on are forced to the on state, and are read by the first control circuit.

According to an embodiment, the inhibition period has a duration in the range from 10-6 times to 10-1 times the sensor integration period.

According to an embodiment, in each block of adjacent pixels, the third control circuit is capable of delivering a binary signal indicating whether all the block pixels are on.

According to an embodiment, the pixel array is divided into macroblocks each comprising a plurality of adjacent blocks and, in each macroblock, a fourth control circuit delivers a binary output signal indicating whether all the pixels in the macroblock are on.

According to an embodiment, when all the pixels in a macroblock are on and a first pixel in the macroblock has been read by the first control circuit, the macroblock is deactivated without for the other pixels in the macroblock to be read from.

According to an embodiment, the value of the first pixel in the macroblock to have been read is assigned to all the pixels in the macroblock.

The foregoing and other features and advantages will be discussed in detail in the following non-limiting description of specific embodiments in connection with the accompanying drawings.

DETAILED DESCRIPTIONS

Figure 1:
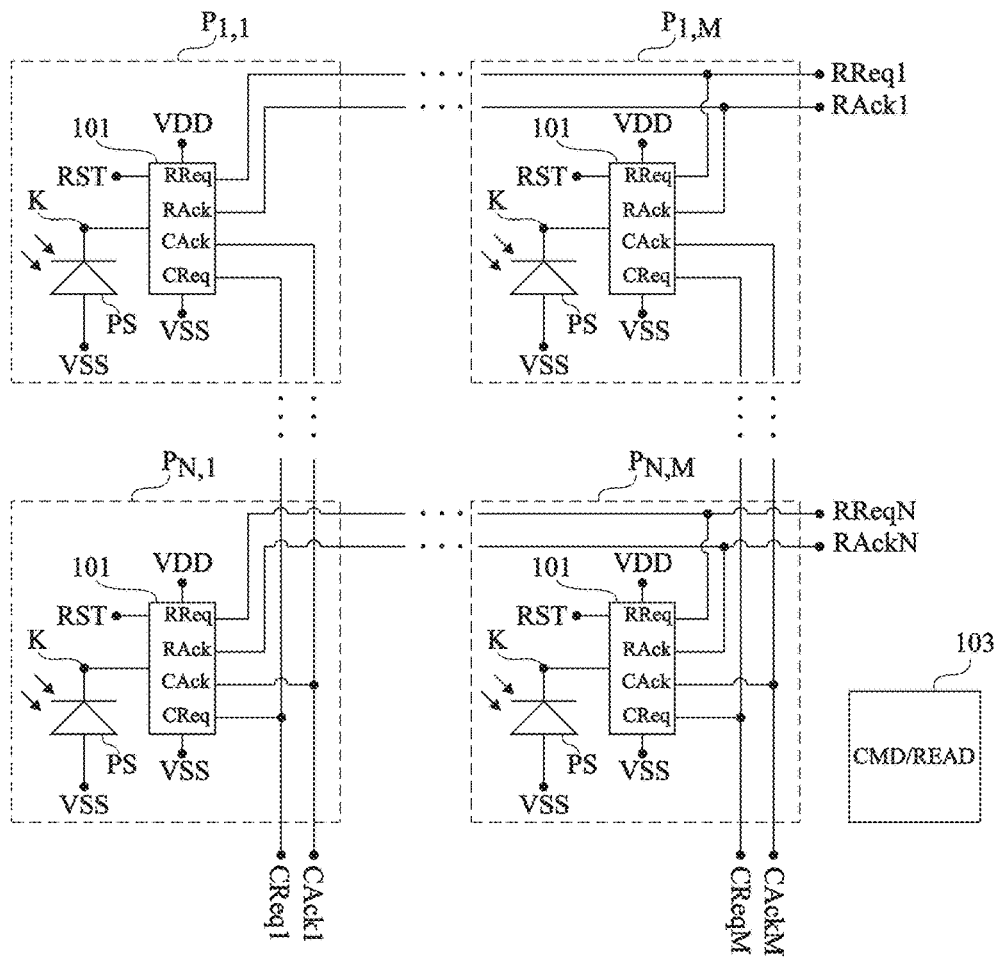
FIG. 1 is a simplified electric diagram of an example of a time code image sensor.

The same elements have been designated with the same reference numerals in the different drawings and, further, the various drawings are not to scale. For clarity, only those elements which are useful to the understanding of the described embodiments have been shown and are detailed. In particular, the control and read circuits external to the pixel array of the described time code image sensors have not been detailed, the described embodiments being compatible with usual read circuits of such sensors. Further, unless otherwise specified, expressions "approximately", "substantially", and "in the order of" mean to within 10%, preferably to within 5%. Further, term "connected" is used herein to designate a direct electric connection, with no intermediate electronic component, for example, by means of one or a plurality of conductive tracks, and term "coupled" or term "linked" is used to designate either a direct electric connection (then meaning "connected") or a connection via one or a plurality of intermediate components (resistor, capacitor, etc.).

FIG. 1 is a simplified electric diagram of an example of a time code image sensor.

The sensor of FIG. 1 comprises a plurality of identical or similar pixels. In the shown example, the sensor comprises N×M pixels Pi,j arranged in an array of N rows and M columns, N and M being integers greater than 1, i being an integer in the range from 1 to N designating the rank of the row of pixel Pi,j, and j being an integer in the range from 1 to M designating the rank of the column of pixel Pi,j.

Each pixel Pi,j comprises a photodetector PS delivering an analog output signal varying along time according to a received light intensity. In this example, photodetector PS is a reverse-biased photodiode, having its anode connected to a node VSS of application of a low reference potential, for example, a low power supply potential of the sensor, and having its cathode connected to a storage node K. In this example, the output node of photodetector PS is the potential of node K (or voltage across the photodiode, considering the potential of node VSS as the reference potential). When the photodiode is illuminated, the potential of node K decreases at a speed which depends on the received light intensity.

Each pixel Pi,j comprises an internal circuit 101 connected to node K. Circuit 101 comprises low and high power supply nodes respectively connected to node VSS and to a node VDD of application of a high reference potential greater than potential VSS, for example, a high power supply potential of the sensor. Circuit 101 further comprises a node RST of application of a binary pixel reset control signal. When the signal applied to node RST is in a so-called active state, for example, in the low state, storage node K is reset to a reset potential substantially equal to high power supply potential VDD. When the signal applied to node RST is in a so-called inactive state, for example in the high state, node K is isolated from the reset potential, so that the potential of node K varies freely according to the received light intensity.

Circuit 101 further comprises a comparator capable of comparing the potential of node K with an intermediate reference potential between potential VSS and potential VDD. This reference potential may be common to all the sensor pixels. Thus, an output node (not shown in FIG. 1) of the comparator is in a first so-called off state, for example, a low state, when the potential of node K is higher than the reference value of the comparator, and in a second so-called on state, for example, a high state, when the potential of node K is smaller than or equal to the reference value of the comparator.

Circuit 101 is capable of asynchronously communicating with a control and read circuit 103 (CMD/READ) external to the pixel array. To achieve this, circuit 101 comprises a node RReq of application of a binary row reading request signal, a node RAck of reception of a binary row acknowledgement signal, a node CReq of application of a binary column reading request signal, and a node CAck of reception of a binary column acknowledgement signal. In the example of FIG. 1, in each pixel row of rank i, nodes RReq of the row pixels are connected to a same conductive track RReqi and nodes RAck of the row pixels are connected to a same conductive track RAcki, and, in each pixel column of rank j, nodes CReq of the column pixels are connected to a same conductive track CReqj and nodes CAck of the column pixels are connected to a same conductive track CAckj. Tracks RReqi, RAcki, CReqj, and CAckj are connected to different input/output nodes (not shown in FIG. 1) of the sensor control and read circuit 103.

The operation of the circuit of FIG. 1 will now be described in relation with FIGS. 1 and 2.

During an image acquisition phase, each pixel is first reset by recharging of its photodiode to a reset voltage. To achieve this, the potential of node RST is set to the active state. The photodiode of each pixel is then isolated from the node of application of the reset voltage, which marks the beginning of the integration period. To achieve this, the potential of node RST is set to the inactive state. In the example of FIG. 1, all pixels are simultaneously reset. As an example, the nodes RST of all the sensor pixels are connected to a same node of application of a reset signal, for example, an output node of circuit 103.

After the reset phase, the voltage across the photodiode of each pixel decreases according to the light intensity received by the pixel. When the voltage across the photodiode of a pixel Pi,j reaches the reference voltage, the output of the pixel comparator switches state. The pixel is said to turn on.

When a pixel turns on, a phase of asynchronous communication with control and read circuit 103 is initiated by the pixel, after which the address of the pixel is read by control and read circuit 103. A digital value representative of the time of reading of the pixel address by circuit 103, for example, the output value of a counter of pulses of a periodic clock signal, is stored in a memory intended to store the image acquired by the sensor. This value forms the output value of the pixel. The period between the pixel turn-on time and the effective time of reading of the pixel address by circuit 103 should be relatively short to avoid significantly altering the brightness information.

Figure 2:
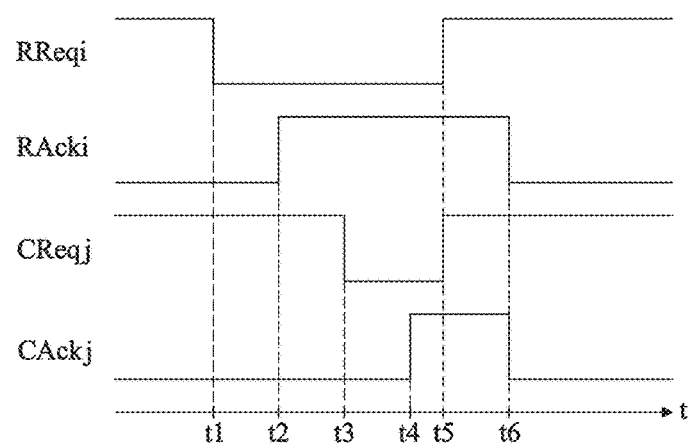
FIG. 2 is a simplified timing diagram schematically illustrating the operation of the sensor of FIG. 1.

FIG. 2 illustrates the variation of the asynchronous communication signals applied to conductive tracks RReqi, RAcki, CReqj, and RAckj during a phase of reading of the address of pixel Pi,j by circuit 103, following the turning-on of pixel Pi,j.

In this example, conductive tracks RReqi and CReqj are considered to be, by default, precharged to a high state by circuit 103, and that conductive tracks RAcki and CAckj are, by default, kept in a low state by circuit 103. The described embodiments are however not limited to this specific case.

At a time t1, when pixel Pi,j turns on, control circuit 101 of pixel Pi,j draws the potential of conductive track RReqi to a low state, for example, to potential VSS. The setting to the low state of track RReqi corresponds to the transmission of a row reading request by pixel Pi,j to circuit 103.

At a time t2 subsequent to time t1, when circuit 103 is capable of processing the request transmitted over the row of rank i, circuit 103 acknowledges the row reading request by applying a row acknowledgement signal on track RAcki. To achieve this, in this example, circuit 103 sets the potential of track RAcki to a high state.

At a time t3 subsequent to time t2, for example, on reception of the row acknowledgement signal, control circuit 101 of pixel Pi,j draws the potential of conductive track CReqj to a low state, for example, to potential VSS. The setting to the low state of track CReqj corresponds to the transmission of a column reading request by pixel Pi,j to circuit 103. To achieve this, at this stage, all the on pixels of the row of rank i transmit a column reading request. On reception of the column reading request, control and read circuit 103 knows that pixel Pi,j is on. If other pixels of line i are on, circuit 103 is also capable of determining their addresses. A value representative of time, for example, the output value of a counter of pulses of a clock signal, is then stored in a memory location corresponding to the image point acquired by pixel Pi,j. If other pixels of line i are on, this same value may be written into memory locations associated with the corresponding pixels.

At a time t4 subsequent to time t3, circuit 103 acknowledges the column reading request by applying a column acknowledgement signal on track CAckj. To achieve this, in this example, circuit 103 sets the potential of track CAckj to a high state.

At a time t5 subsequent to time t4, for example, on reception of the column acknowledgement signal, control circuit 101 of pixel Pi,j stops drawing conductive tracks RReqi and CReqj of the pixel to a low potential, the tracks then recharging to a high value set by circuit 103.

At a time t6, for example, subsequent to time t5, circuit 103 sets back the potentials of row acknowledgement track RAcki and column acknowledgement track CAckj to the low state, which marks the end of the phase of reading the address of pixel Pi,j.

Circuit 103 then starts waiting for a new row request, or acknowledges a row request waiting to be processed. It should indeed be noted that in the embodiment which has just been described, control and read circuit 103 may simultaneously acknowledge a plurality of column reading requests, but can only acquire a single row reading request at once to be able to determine with certainty the addresses of the on pixels.

Once the address of pixel Pi,j has been read, for example, on reception of column acknowledgement signal CAck, control circuit 101 of the pixel deactivates the pixel so that this pixel can no longer transmit a reading request until the end of the image acquisition phase.

At the end of a predetermined integration period marking the end of the image acquisition phase, if one or a plurality of pixels are not on, a same output value corresponding to the lowest brightness level of the image is assigned to the pixels.

Figure 3:
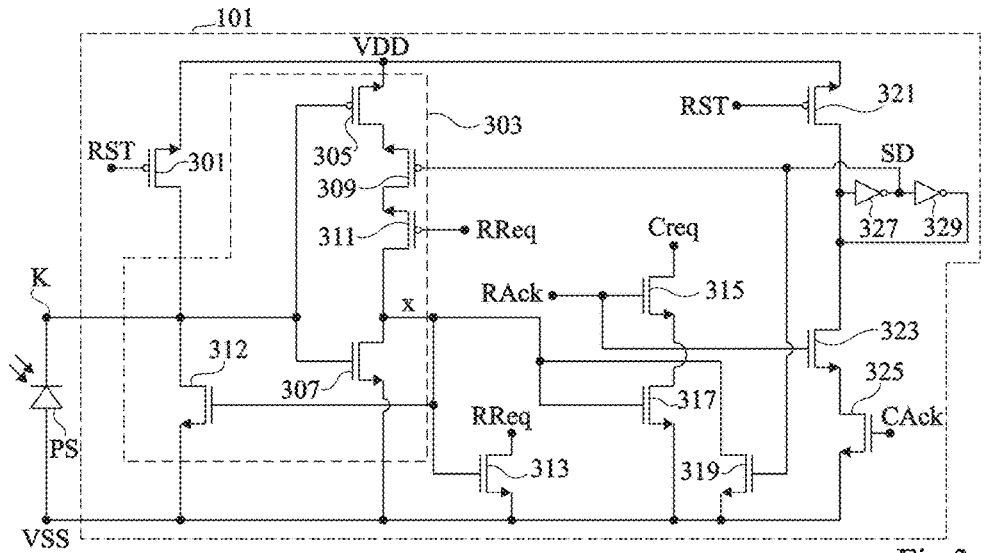
FIG. 3 is a detailed electric diagram of an embodiment of a pixel of the sensor of FIG. 1.

FIG. 3 is a more detailed electric diagram of an embodiment of a pixel of the sensor of FIG. 1. FIG. 3 more specifically details an embodiment of the control circuit 101 of a pixel of the sensor of FIG. 1.

In this example, circuit 101 comprises a reset transistor 301 connecting node K to node VDD and having its gate connected to node RST. In the shown example, transistor 301 is a P-channel MOS transistor having its source connected to node VDD and having its drain connected to node K.

Circuit 101 further comprises a comparator 303 comprising an input node connected to output node K of photodetector PS, and an output node X. The comparator is capable of delivering on its output node X a binary signal having a first state, for example, a low state, when the potential of node K is higher than a reference value of the comparator, and a second state, for example, a high state, when the potential of node K is lower than the reference value of the comparator. In the shown example, comparator 303 comprises an inverter comprising two transistors 305 and 307 of opposite conductivity types, coupled in series between nodes VDD and VSS. In this example, the comparator further comprises two deactivation transistors 309 and 311 coupling transistor 305 to transistor 307. Thus, comparator 303 comprises, between nodes VDD and VSS, the series association of the four successive transistors 305, 309, 311, and 307. The gates of transistors 305 and 307 are connected to node K and form the input of comparator 303. The junction point of transistors 311 and 307 is connected to node X and forms the output of comparator 303. In this example, transistors 305, 309, and 311 are P-channel MOS transistors, and transistor 307 is an N-channel MOS transistor. The source of transistor 305 is connected to node VDD. The source of transistor 309 is connected to the drain of transistor 305. The source of transistor 311 is connected to the drain of transistor 309. The drain of transistor 311 is connected to node X and to the drain of transistor 307. The source of transistor 307 is connected to node VSS. In this example, so that it has sharper transitions, comparator 303 further comprises a feedback loop comprising a transistor 312 coupling node K to node VSS and having its gate connected to node X. In the shown example, transistor 312 is an N-channel MOS transistor having its source connected to node VSS and having its drain connected to node K.

Circuit 101 further comprises a transistor 313 coupling node RReq to node VSS, and having its gate connected to node X. In this example, transistor 313 is an N-channel MOS transistor having its source connected to node VSS and having its drain connected to node RReq.

Circuit 101 further comprises two transistors 315 and 317 series-connected between node CReq and node VSS. Transistor 315, connected to node CReq, has its gate connected to node RAck, and transistor 317, connected to node VSS, has its gate connected to node X. In this example, transistors 315 and 317 are N-channel MOS transistors, the source of transistor 317 is connected to node VSS, the source of transistor 315 is connected to the drain of transistor 317, and the drain of transistor 315 is connected to node CReq.

Circuit 101 further comprises a transistor 319 coupling node X to node VSS. In this example, transistor 319 is an N-channel MOS transistor having its source connected to node VSS and having its drain connected to node X.

Circuit 101 further comprises three transistors 321, 323, and 325 series-connected between nodes VDD and VSS. Transistor 321, connected to node VDD, is a reset transistor having its gate connected to node RST. The gate of transistor 323 is connected to node RAck, and the gate of transistor 325 is connected to node CAck. In this example, transistor 321 is a P-channel MOS transistor, and transistors 323 and 325 are N-channel MOS transistors. Transistor 321 has its source connected to node VDD and its drain connected to the drain of transistor 323, transistor 323 has its source connected to the drain of transistor 325, and transistor 325 has its source connected to node VSS.

Circuit 101 further comprises two series-connected inverters 327 and 329, the input of inverter 327 being connected to the junction point of transistors 321 and 323, and to the output of inverter 329. Junction point SD of inverters 327 and 329 (that is, the output node of inverter 327 and the input node of inverter 329) is connected to the gate of transistor 309 and the gate of transistor 319.

The operation of the pixel of FIG. 3 will now be described.

In a reset phase, the potential of node RST is set to the low state, which causes the turning-on of transistors 301 and 321. Node K is then reset to a potential substantially equal to potential VDD (to within the voltage drop of transistor 301). Further, the memory point formed by the association of inverters 327 and 329 is reset to the low state, that is, the potential of node SD is set to the low state, whereby transistor 309 is conductive and transistor 319 is non-conductive. It is further first considered that transistor 311 is controlled to the conductive state.

At the end of the reset phase, the potential of node K is in a high state and output X of comparator 303 is in a low state. Transistors 313 and 317 are thus non-conductive. Signal RST is set back to the high state, so that node K is isolated from node VDD, which marks the beginning of the integration period. The potential of node K then decreases according to the received light intensity.

When the potential of node K falls under the switching threshold of the inverter forming comparator 303, node X switches to the high state, which corresponds to the pixel turning-on.

Transistor 313 then turns on, and node RReq of the pixel is drawn substantially to the potential of node VSS, which corresponds to the transmission of a row reading request by the pixel. Transistor 317 is further turned on.

When row acknowledgement signal RAck is set to the high state by control and read circuit 103 (FIG. 1), transistor 315 becomes conductive, and node CReq of the pixel is substantially drawn to the potential of node VSS, which corresponds to the transmission of a column reading request by the pixel. Transistor 323 is further made conductive.

When column acknowledgement signal CAck is set to the high state by control and read circuit 103 (FIG. 1), transistor 325 becomes conductive, which causes the writing of a high state into the memory point formed by inverters 327 and 329. Thus, node SD is set to the high state, and remains in the high state until the next resetting of the pixel. As a result, transistor 309 is made non-conductive, so that comparator 303 is deactivated until the end of the image acquisition phase. Further, transistor 319 is made conductive, so that node X is taken back to a low state (substantially at the potential of node VSS), which amounts to forcing the pixel to the off state until the end of the acquisition phase.

In the example of FIG. 3, the gate of transistor 311 is connected to node RReq, which enables to deactivate comparator 303 when signal RReq is set to the high state.

A problem which may arise in a sensor of the type described in relation with FIGS. 1 to 3 is that of collisions of events, when a plurality of sensor pixels turn on simultaneously or at close times. Indeed, the set of operations between the turning-on of a pixel and the effective reading of its address by circuit 103 induces a time shift which is superimposed to the brightness information. This shift is negligible if only a small number of pixels turn on at the same time, but may significantly alter the quality of the image if many pixels turn on simultaneously, for example, if large sensor areas receive substantially the same brightness level, which occurs relatively often in current scenes.

An object of an embodiment is to at least partly solve this problem.

Figure 4:
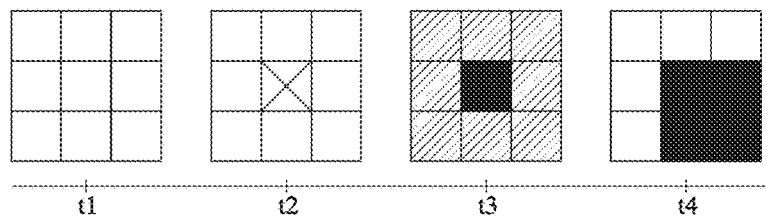
FIG. 4 schematically shows the operation of a time code image sensor according to a first embodiment.

FIG. 4 schematically shows the operation of a time code image sensor according to a first embodiment.

According to an aspect of the first embodiment, the sensor pixel array is divided into blocks of a plurality of pixels. In the example illustrated in FIG. 4, the array of pixels of the sensor is divided into blocks of 3×3 pixels.

FIG. 4 schematically shows a pixel block of the sensor at several times of an image acquisition phase.

At a time t1 of beginning of the acquisition phase, all the pixels in the block are in a non-forced off state, that is, in each pixel of the block, the pixel comparator is activated but has not switched yet since the output signal of the photodetector has not reached the reference value of the pixel comparator yet. The pixels in the non-forced off state are shown in white in FIG. 4.

At a time t2 subsequent to time t1, the brightest pixel of the pixel block, that is, the central pixel of the block in the shown example, turns on. The pixels in the on state are marked with crosses in FIG. 4. This is followed by a phase of asynchronous communication between the pixel and the sensor control and read circuit, for example, of the type described in relation with FIG. 2, this communication particularly comprising the transmission of an address reading request by the control circuit of the on pixel (in the form of a pulse on track RReqi in the example of FIG. 2), and resulting in the determining of the address of the on pixel by the control and read circuit of the sensor.

At a time t3 subsequent to time t2, after reception of an address reading acknowledgement signal transmitted by the control and read circuit of the sensor (in the form of a pulse on track CAckj in the example of FIG. 2), the pixel is forced to the off state until the end of the acquisition phase, that is, the output of its comparator is forced to the off state and no longer depends on the light intensity received by the photodetector.

At time t3, all the pixels in the block are inhibited during a predetermined inhibition period Tinh, which is preferably short as compared with the total integration period of the sensor (that is, the period between the end of the reset phase and the end of the image acquisition phase—or frame time). As an example, inhibition period Tinh is between $10^{-6}$*Timg and $10^{-1}$*Timg, for example, in the order of $10^{-4}$*Timg, Timg being the total integration period of the sensor, for example, between 5 and 50 ms, for example, in the order of 20 ms.

As will be explained in further detail hereafter, an inhibited pixel behaves substantially in the same way as what has been previously described in relation with FIGS. 1 to 3, with the difference that it cannot transmit an address reading request.

When a pixel in the non-forced off state is inhibited, this pixel is capable of turning on during inhibition period Tinh. If this pixel turns on during inhibition period Tinh, it transmits no address reading request and it is directly forced to the off state until the end of the acquisition phase, without passing through the phase of asynchronous communication with the control and read circuit of the sensor.

Further, if the inhibition of a pixel occurs while the pixel is already on (for example, if the pixel turning-on occurs in interval t2-t3 in the example of FIG. 4), this pixel is forced to the off state until the end of the acquisition phase, without passing through the phase of asynchronous communication with the reading circuit of the sensor.

The pixels in the inhibited state are shown in hatchings in FIG. 4.

At the end of inhibition period Tinh, at a time t4, the pixel block is disinhibited, that is, for the pixels in the block which have not been forced to the off state yet, the transmission of address reading requests is made possible again, and the acquisition phase is carried on identically or similarly to what has been previously described in relation with FIGS. 1 to 3.

At the end of integration period Timg of the sensor, if there remain pixels in the non-forced off state, these pixels are forced to the on state, and are read by the reading circuit of the sensor identically or similarly to what has been previously described in relation with FIGS. 1 to 3.

The final image is reconstructed by assigning, in each pixel block, to all the pixels in the block which have not been read by the reading circuit, the value of the brightest pixel in the block.

Thus, in the embodiment of FIG. 4, instead of effectively reading of all the sensor pixels, at the risk of generating a significant quantity of collisions causing significant distortions of the image, it is provided, in each pixel block of the sensor, to assign the value of the brightest pixel in the block to all the pixels in the block receiving a light intensity close to that received by this pixel.

This operation is particularly advantageous when a range of same brightness level covers a plurality of full pixel blocks. In this case, a single pixel per block is effectively read by the reading circuit, which enables to significantly decrease collisions.

In the operating mode described in relation with FIG. 4, a single inhibition period is implemented in each pixel block, on reception of the acknowledgement of the reading of the brightest pixel in the block. If pixels of the block are not on at the end of inhibition period Tinh, these pixels are read identically or similarly to what has been previously described in relation with FIGS. 1 to 3. It should be noted that on reading of the pixels, collisions may occur. However, dark pixels are less sensitive to collisions, that is, to distortions of the time value representative of the received light intensity, than brighter pixels. Indeed, for a same transmission delay of a pixel turn-on time, the coding error is larger for a bright pixel, that is, conducting a strong photocurrent (and where the capacitance of the photodetector thus discharges rapidly), than for a dark pixel that is, conducting a low photocurrent (and where the photodetector capacitance thus discharges slowly). It is thus advantageous to inhibit a pixel block at the time of the reading its brightest pixel, the darkest pixel ranges being naturally less sensitive to transmission delays.

The embodiment of FIG. 4 is of course not limited to the case where the simultaneously inhibited pixel blocks are square blocks of 3×3 pixels. More generally, each block comprises at least two adjacent pixels. The blocks are preferably all of the same size. The blocks are for example array blocks of n rows and m columns of adjacent pixels, n and m being integers greater than 1, n and m being for example sub-multiples of N and M, respectively. As an example, the blocks are array blocks of from 4 to 100 adjacent pixels.

Figure 5:
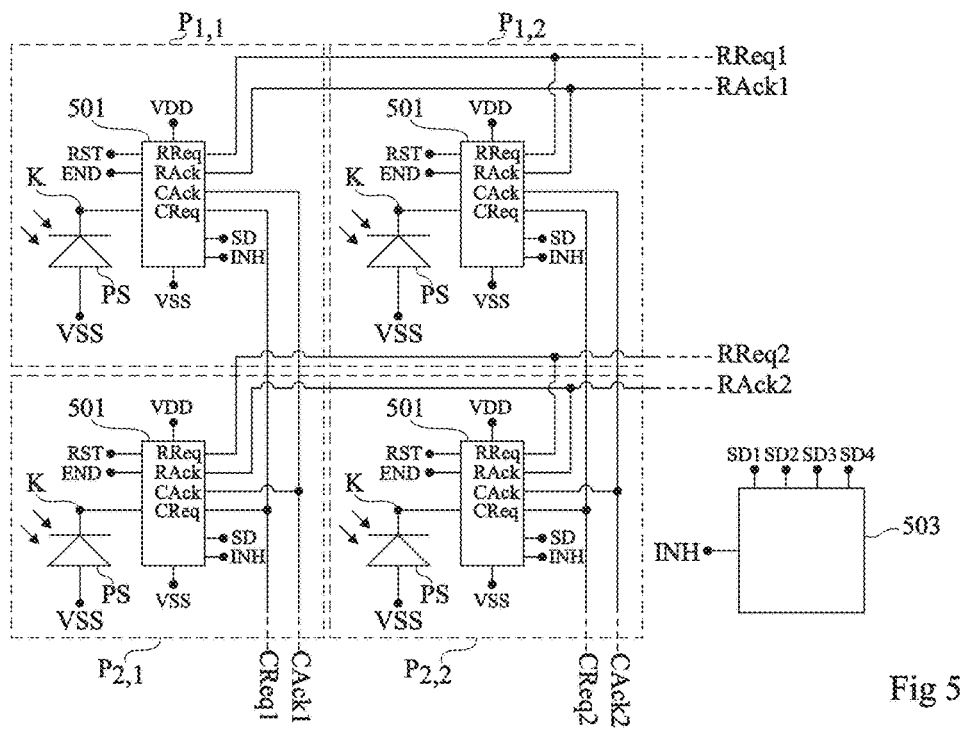
FIG. 5 is a partial simplified electric diagram of an example of a time code image sensor according to the first embodiment.

FIG. 5 is a partial simplified electric diagram of an embodiment of a time code image sensor capable of implementing the operation described in relation with FIG. 4.

The sensor of FIG. 5 comprises elements common with the sensor of FIG. 1. These elements will not be detailed again hereafter. In the following, only the differences between the sensor of FIG. 5 and the sensor of FIG. 1 will be detailed.

As in the example of FIG. 1, the sensor of FIG. 5 comprises a plurality of identical or similar pixels Pi,j arranged in an array of rows and columns. In the example of FIG. 5, the pixels are distributed in blocks of 2×2 adjacent pixels. In FIG. 5, a single block of the sensor has been shown, this block comprising the pixels common to the rows of rank 1 and 2 and to the columns of rank 1 and 2 of the sensor.

In the example of FIG. 5, each pixel Pi,j comprises an internal control circuit 501 connected to output node K of the photodetector, replacing internal control circuit 101 of the example of FIG. 1. Circuit 501 comprises elements common with circuit 101. These elements will not be detailed again. In the following, only the differences between circuit 501 and circuit 101 will be detailed.

In addition to nodes VDD, VSS, RST, RReq, RAck, CReq, CAck already described in relation with FIG. 1, internal control circuit 501 of FIG. 5 comprises a node SD for providing a binary signal indicating whether the pixel is or not forced to the off state. As an example, node SD of circuit 501 of FIG. 5 corresponds to node SD of circuit 101 of FIG. 3.

Circuit 501 of FIG. 5 further comprises a node INH of application of a binary pixel inhibition signal. When the inhibition signal applied to node INH is in a first so-called active state, for example, in the high state, the pixel is inhibited. When the inhibition signal applied to node INH is in a second so-called inactive state, for example, in the low state, the pixel is disinhibited.

Circuit 501 of FIG. 5 further comprises a node END of application of a binary signal enabling to force the turning-on of the pixel at the end of the sensor integration period if the pixel has not already been forced to the off state. When the signal applied to node END is in a so-called active state, for example, in the high state, storage node K is set to a low potential, for example, substantially equal to low power supply potential VSS, which causes the pixel turning-on if the pixel has not already been forced to the off state. When the signal applied to node END is in a so-called inactive state, for example in the low state, node K is isolated from node VSS, and the potential of node K varies freely according to the received light intensity.

The sensor of FIG. 5 comprises, as in the example of FIG. 1, a control and read circuit 103 (not shown in FIG. 5) external to the pixel array, and with which the control circuit 501 of each pixel is capable of asynchronously communicating via its nodes RReq, RAck, CReq, and CAck.

In the sensor of FIG. 5, each pixel block of the sensor comprises a block control circuit 503 connected to each of the pixels in the block. The control circuits 503 of the different blocks may be identical or similar. In the shown example, each pixel has its node SD connected to an input node of circuit 503. The different pixels in the block have their nodes SD connected to different input nodes of circuit 503. In the shown example, circuit 503 comprises four input nodes SD1, SD2, SD3, SD4 respectively connected to nodes SD of the four pixels in the block.

Block control circuit 503 further comprises a node of delivery of a binary block inhibition signal, connected to nodes INH of each of the pixels in the block.

Block control circuit 503 operates as follows.

At the beginning of an image acquisition phase after resetting of the pixels, the signals indicative of a forced turning-off provided by nodes SD of the different pixels in the block are in the inactive state, that is, no pixel is forced to the off state. The inhibition signal delivered by block 503 then is in the inactive state.

When the brightest pixel in the block receives a reading acknowledgement from control and read circuit 103, this pixel is forced to the off state by its internal control circuit, and the node SD of this pixel switches state.

The inhibition signal delivered by block 503 then switches to the active state for a predetermined inhibition period Tinh.

At the end of period Tinh, the inhibition signal switches back to the inactive state, and then remains in the inactive state until the end of the acquisition phase.

It should be noted that the forming of block control circuit 503 has not been detailed, the forming of such a circuit being within the abilities of those skilled in the art based on the above-mentioned functional indications. As an example, circuit 503 may comprise: a logic circuit enabling to active the inhibition signal when one of nodes SD1, SD2, SD3, SD4 switches state, a delay circuit, for example, a RC circuit, enabling to set period Tinh of activation of the inhibition signal, and a memory point enabling, when the block has been inhibited, to deactivate block control circuit 503 until the end of the image acquisition phase.

Outside of inhibition period Tinh, the operation of the sensor of FIG. 5 is identical or similar to what has been described in relation with FIGS. 1 to 3.

Further, in the sensor of FIG. 5, at the end of the integration period, a signal for forcing to the on state is applied onto node END of each of the sensor pixels so that, if there remain pixels in the non-forced off state, these pixels are forced to the on state. These pixels are then read by the sensor read circuit identically or similarly to what has been previously described in relation with FIGS. 1 to 3. As an example, all the sensor pixels simultaneously receive the same signal for forcing to the on state. To achieve this, the nodes END of all the sensor pixels may be connected to a same output node of circuit 103. As a variation, the pixels may be forced to the on state row by row, with a time shift between rows, to limit collision risks. To achieve this, in each sensor pixel row, nodes END of the row pixels are connected to a same output node of circuit 103, and nodes END of the pixels of different rows are connected to different output nodes of circuit 103.

Figure 6:
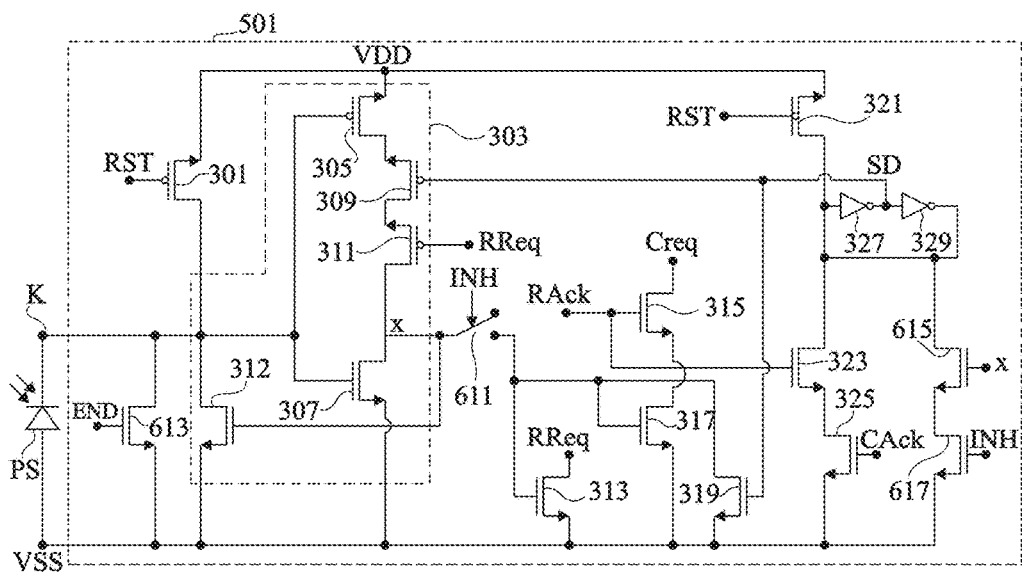
FIG. 6 is a detailed electric diagram of an embodiment of a pixel of the sensor of FIG. 5.

FIG. 6 is a more detailed electric diagram of an embodiment of a pixel of the sensor of FIG. 5. FIG. 6 more specifically details an embodiment of the control circuit 501 of the pixel.

Control circuit 501 of the pixel of FIG. 6 comprises the same elements as control circuit 101 of the pixel of FIG. 3, arranged substantially in the same way. These elements will not be detailed again hereafter. In the following, only the differences between circuit 501 of FIG. 6 and circuit 101 of FIG. 3 will be detailed.

In the example of FIG. 6, output node X of comparator 303 is not directly connected to the gates of transistors 313 and 317, but is coupled to a node X' via a switch 611 having a control node connected to node INH of the circuit. Further, in the example of FIG. 6, transistor 319 is not directly connected to node X, but is connected to node X'. More particularly, in this example, the source of transistor 319 is connected to node VSS and its drain is connected to node X'. When the inhibition signal applied to node INH is in the active state, for example, in the high state, switch 611 is off, and, when the inhibition signal applied on node INH is in the inactive state, for example, in the low state, switch 611 is on.

Further, circuit 501 comprises a transistor 613 coupling node K to node VSS, the gate of transistor 613 being connected to node END of the circuit. In the shown example, transistor 613 is an N-channel MOS transistor having its source connected to node VSS and having its drain connected to node K.

Circuit 501 further comprises two transistors 615 and 617 in series between the input of inverter 327 and node VSS, in parallel with the series association of transistors 323 and 325. Transistor 615, connected to the input transistor 327, has its gate connected to node X, and transistor 617, connected to node VSS, has its gate connected to node INH. In the shown example, transistors 615 and 617 are N-channel MOS transistors, the source of transistor 617 being connected to node VSS, the drain of transistor 617 being connected to the source of transistor 615, and the drain of transistor 615 being connected to the input of inverter 327.

When the signals applied to nodes END and INH are in the inactive state, that is, when transistors 613 and 617 are non-conductive and switch 611 is conductive, the operation of the pixel of FIG. 6 is identical or similar to that of the pixel of FIG. 3.

When signal INH is set to the active state during the period of inhibition of the block containing the pixel, switch 611 is off, so that the pixel can no longer transmit an address reading request. Transistor 617 is further conductive, so that, if the pixel turns on, that is, if the potential of node X switches to the high state, node SD is set to the high state, and remains in the high state until the next resetting of the pixel. The pixel is then forced to the off state until the end of the acquisition phase.

When signal END is set to the active state (in the high state in the present example), transistor 613 is made conductive. As a result, the potential of node K is lowered substantially to the potential of node VSS. Thus, if the pixel was still in the non-forced off state, the pixel turns on.

The described embodiments are not limited to the specific example of pixel described in relation with FIG. 6. More generally, other pixel architectures capable of implementing the operation described in relation with FIGS. 4 and 5 may be provided.

Figure 7:
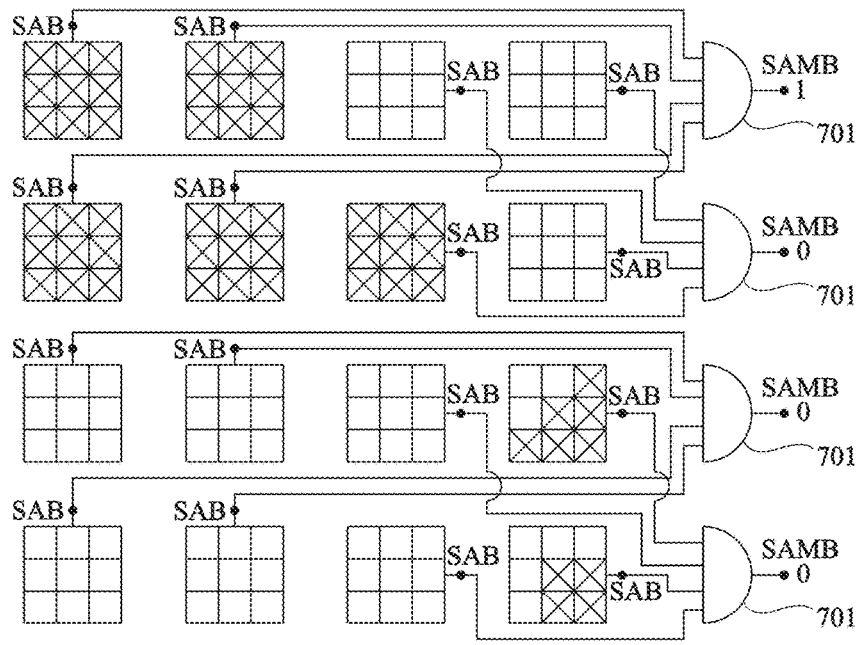
FIG. 7 schematically shows the operation of a time code image sensor according to a second embodiment.

FIG. 7 schematically shows the operation of a time code image sensor according to a second embodiment.

In the same way as in the embodiment of FIG. 4, the pixel array is divided into blocks of a plurality of adjacent pixels. In the example illustrated in FIG. 7, the array is divided into blocks of 3×3 pixels. FIG. 7 schematically shows a sensor portion comprising 4×4 blocks of adjacent pixels, that is, 12×12 adjacent pixels.

The pixels of the sensor of FIG. 7 are for example capable of operating identically or similarly to what has been described in relation with FIGS. 1 to 3.

Each pixel block of the sensor of FIG. 7 further comprises a block control circuit capable of determining whether all the pixels in the block are simultaneously on. The block control circuit for example comprises an AND logic gate receiving as an input the output signals of the comparators of all the pixels in the block, and delivering a binary signal SAB (block turn-on signal) having a first state (on state), for example, a high state, when all the pixels in the block are on, and a second state (off state), for example, a low state, when at least one pixel in the block is not on. In FIG. 7, the block control circuits have not been shown. Only the nodes of delivery of block turn-on signals SAB have been shown.

In the embodiment of FIG. 7, the pixel blocks are further gathered in macroblocks, each comprising a plurality of adjacent blocks. In the shown example, the pixel array is divided into macroblocks of 2×2 adjacent blocks. The described embodiments are however not limited to this specific division.

Each macroblock is associated with a logic circuit, an AND gate in the shown example, receiving the block turn-on signals SAB of the different blocks in the macroblock, and delivering a binary signal SAMB (macroblock turn-on signal) having a first state (on state), for example, a high state, when all the blocks in the macroblock are on, and a second state (off state), for example, a low state, when at least one block in the macroblock is not on.

Each macroblock further comprises a macroblock control circuit capable, when signal SAMB of the macroblock is in the on state and the reading of one of the macroblock pixels has been acknowledged, of simultaneously acknowledging the reading of all the pixels in this macroblock. To achieve this, the macroblock control circuit may for example force to the inhibited state the signals INH of each of the blocks in the macroblock.

The above-mentioned macroblocks, or level-1 macroblocks, may further be gathered into macroblocks of high levels each comprising a plurality of adjacent level-1 macroblocks. As an example, the level-1 macroblocks may be gathered in level-2 macroblocks, each comprising 2×2 adjacent level-1 macroblocks, the level-2 macroblock may be gathered into level-3 macroblocks, each comprising 2×2 adjacent level-2 macroblocks, and so on until a macroblock level n, which for example includes the entire sensor pixel array.

Each macroblock of level i greater than 1 is associated with a logic circuit, for example, an AND gate receiving the turn-on signals of the different macroblocks of level i−1 of this macroblock, delivering a binary signal for turning on the macroblock.

Each macroblock of level i greater than 1 further comprises a macroblock control circuit capable, when the level-i macroblock is in the on state and the reading of one of the macroblock pixels has been acknowledged, of simultaneously acknowledging the reading of all the pixels in this macroblock. To achieve this, the macroblock control circuit may for example force to the inhibited state the signals INH of each of the blocks in the level-i macroblock, for example, via intermediate acknowledgement signals propagating according to a tree layout similar to that of the turn-on signals of the different macroblock levels.

The pixels thus acknowledged are forced to the off state and thus can no longer transmit a reading request, which decreases the risk of collisions for the rest of the acquisition. The output value of the pixel effectively read is assigned to all the pixels in the macroblock or in the macroblocks having pixels which have simultaneously turned on.

Thus, in the embodiment of FIG. 7, instead of effectively reading all the sensor pixels, it is provided, when areas of the image covering one or a plurality of pixel macroblocks have substantially the same brightness level, to read a single pixel of the concerned area and to assign the read value to all the pixels in the area.

The embodiment of FIG. 7 may be combined with the embodiment described in relation with FIGS. 4 to 6. As an example, when the first pixel of a block is acknowledged, the control circuit may first determine whether the entire macroblock containing this pixel is on, in which case the operation described in relation with FIG. 7 is implemented. All the pixels in the macroblock are then deactivated until the end of the acquisition phase. If the entire macroblock is not on, an operation of the type described in relation with FIGS. 4 to 6 may be implemented, that is, the block is temporarily inhibited for a period Tinh, and is then reactivated at the end of period Tinh.

Specific embodiments have been described. Various alterations, modifications, and improvements will readily occur to those skilled in the art.

In particular, the described embodiments are not limited to the above-mentioned example where the photodetector is a reverse-biased photodiode having its capacitance discharged by a photocurrent according to a received light intensity. More generally, any photodetector delivering an output signal varying along time according to a received light intensity may be used.

Further, the described embodiments are not limited to the specific example of asynchronous communication protocol described in relation with FIG. 2 to implement communications between the sensor pixels and the control and read circuit of the sensor.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An image sensor comprising:
a first control circuit;
a plurality of pixels, each comprising a photodetector, a comparator of the level of an output signal of the photodetector with a reference value, and a second control circuit connected to the first control circuit, the second circuit being capable of sending a signal of address reading request to the first circuit when the pixel turns on, that is, when the level of the output signal of its photodetector reaches the reference value, of receiving an address reading acknowledgement signal transmitted by the first circuit, and of deactivating the pixel on reception of the reading acknowledgement signal; and
at least one third control circuit capable, when a pixel receives a reading acknowledgement signal, of blocking the transmission of signals of address reading request in at least one adjacent pixel.

2. The sensor of claim 1, wherein the pixels are arranged in an array of rows and columns, the array being divided into a plurality of blocks of adjacent pixels, the sensor comprising a third circuit of control by pixel block, connected to the second circuits of the different pixels in the block.

3. The sensor of claim 2, wherein in each block of adjacent pixels, the third control circuit is capable, during an image acquisition phase, when a first pixel in the block receives a reading acknowledgement signal, of blocking the transmission of signals of address reading request in all the pixels in the block for a predetermined inhibition period.

4. The sensor of claim 3, wherein the pixels of the block which turn on during the inhibition period are deactivated without being read by the first control circuit.

5. The sensor of claim 4, wherein the value of the first pixel in the block to have been acknowledged is assigned to the block pixels which have been deactivated during the inhibition period.

6. The sensor of claim 3, wherein at the end of the inhibition period, for the block pixels which have not turned on yet, the transmission of address reading requests is unlocked.

7. The sensor of claim 3, wherein, at the end of a predetermined integration period of the sensor, the sensor pixels which have not turned on are forced to the on state, and are read by the first control circuit (103).

8. The sensor of claim 7, wherein the inhibition period has a duration in the range from $10^{-6}$ times to $10^{-1}$ times the sensor integration period.

9. The sensor of claim 2, wherein, in each block of adjacent pixels, the third control circuit is capable of delivering a binary signal indicating whether all the block pixels are on.

10. The sensor of claim 9, wherein the pixel array is divided into macroblocks, each comprising a plurality of adjacent blocks, and wherein, in each macroblock, a fourth control circuit delivers a binary output signal indicating whether all the pixels in the macroblock are on.

11. The sensor of claim 10, wherein, when all the pixels of a macroblock are on and a first pixel in the macro-block has been read by the first control circuit (103), the macroblock is deactivated without for the other pixels in the macroblock to be read.

12. The sensor of claim 11, wherein the value of the first pixel in the macroblock to have been read is assigned to all the pixels in the macroblock.

13. The sensor of claim 1, wherein the pixels are distributed in a plurality of adjacent pixel blocks, the sensor comprising, for each block, at least one third control circuit capable, during an image acquisition phase, when a first pixel in the block receives a reading acknowledgement signal, of blocking the transmission of signals of address reading request in all the pixels in the block for an inhibition period.

\* \* \* \* \*